May 21, 1940. H. A. SOULIS 2,201,353
MOTOR VEHICLE CONSTRUCTION
Filed March 19, 1938 3 Sheets-Sheet 1

INVENTOR
Harold A. Soulis
BY
ATTORNEY

May 21, 1940.  H. A. SOULIS  2,201,353
MOTOR VEHICLE CONSTRUCTION
Filed March 19, 1938  3 Sheets-Sheet 2

INVENTOR
Harold A. Soulis
BY
ATTORNEY

May 21, 1940.  H. A. SOULIS  2,201,353
MOTOR VEHICLE CONSTRUCTION
Filed March 19, 1938  3 Sheets-Sheet 3

INVENTOR
Harold A. Soulis
BY
P. Frank Samish
ATTORNEY

Patented May 21, 1940

2,201,353

UNITED STATES PATENT OFFICE 2,201,353

MOTOR VEHICLE CONSTRUCTION

Harold A. Soulis, Westfield, N. J.

Application March 19, 1938, Serial No. 196,804

10 Claims. (Cl. 188—3)

This invention relates generally to motor-vehicle constructions and is more particularly directed to the provision of means for controlling and arresting relative angular horizontal movement between a powered vehicle and one hauled thereby, under the divers conditions that obtain in highway operation, as well as in so-called spotting of the hauled vehicle for loading or other purposes.

In my co-pending application, Serial No. 149,132, filed June 19, 1937, of which this is a continuation in part, I have disclosed certain means or mechanisms for controlling and arresting the relative angular horizontal movement of a powered vehicle and a trailer coupled thereto by a fifth wheel, embodying a king-pin, operative in response to the functioning of the braking systems of the two vehicles, or independently thereof and the present invention contemplates certain additional features of construction designed for use in conjunction with my aforesaid means or mechanisms to increase the factor of safety in the operation of hauled and hauling motor-vehicles along the highway and in their handling generally.

As is well known, in the operation of a powered and a hauled vehicle upon the highways, there is an ever-present hazard of the two vehicles jack-knifing or moving angularly toward each other, when the brakes are applied or when the hauled vehicle overrides the hauling vehicle, by exerting forward directional movement against the king-pin or connection between the two, as when they may be traversing a slippery road surface, or otherwise, or descending a hill. In such jack-knifing movement, the powered vehicle skids in one direction while the hauled vehicle simultaneously skids in the opposite direction, until they come together with more or less resulting damage thereto and possible injury to the operating crew as well as to other vehicles on the road.

This so-called jack-knifing naturally results from instability of the powered and hauled vehicles in motion. It is a general principle of stability of motion that if the point of application of the driving force is located ahead of the point or points where the resistance to motion is encountered, the motion is stable, or the moving body is in a state of stable equilibrium. On the other hand, when the point of application of the propelling force is located behind the point or points where the resistance to motion is met, then the motion is inherently unstable, unless the moving body or vehicle is positively guided.

Therefore, when the powered vehicle and the hauled vehicle are operated over a slippery road surface, and the brakes are applied, those of the powered vehicle will exert a greater retarding effort than the hauled vehicle brakes and the inertia of the latter vehicle will tend to skid the hauled vehicle wheels, causing jack-knifing. This skidding, is more than likely to occur with a suddenness to place it beyond the control of the operator of the powered vehicle, because of the fact that the tires have no greater resistance to side movement than they have to forward motion.

While it has been proposed to minimize jack-knifing by providing only the hauled vehicle with brakes, operated from the hauling vehicle, this is impracticable for many reasons. For instance, excessive tire wear would result and of more importance, the braking effort would be inadequate for safety at higher speeds and especially on grades.

As set forth in my aforesaid co-pending application, I have provided means operable in response to the functioning of the braking systems of the hauled and hauling vehicles to control and arrest the relative angular horizontal movement of the two vehicles, or operable independently thereof for spotting the hauled vehicle or for other purposes, which includes what may be termed a fifth wheel brake, such construction as I may employ comprehending the use of such power as may be utilized for functioning the vehicle braking systems effective in operating the fifth wheel brake, under various conditions of service. While the invention of my said application attains all of the objectives therein set forth in a practical and economical manner, I have found that I may further increase the factor of safety in the operation of hauled and hauling vehicles and virtually eliminate jack-knifing tendencies induced by conditions of operation that are not a concomitant of braking effort applied to arresting the forward or backward travel of the coupled vehicles, and that, normally, are beyond the control of the operator of the powered vehicle.

Therefore, it is the general object of this invention to provide means for eliminating jack-knifing or relative angular horizontal movement of a powered vehicle and a hauled vehicle, as a so-called trailer, or semi-trailer, under various operating conditions, as when the train is traveling along a slippery road surface, or descending a grade, or for one reason or another the inertia of the trailing vehicle causes it to override the towing vehicle.

A further object of this invention is to provide a means or mechanism for eliminating or preventing relative angular horizontal movement of a towing vehicle and a hauled vehicle, under divers service conditions, which otherwise might result when the coupled vehicles are not under the restraint of braking effort, initiated in the powered vehicle, or elsewhere in the train.

Another object of my invention is to provide a means to control and arrest relative angular horizontal movement of a hauled and a hauling vehicle about the axis of their connection which will automatically respond to the inertia of the hauled vehicle, in the operation of the train upon the highway, irrespective of the application of braking effort to the vehicles from the powered vehicle, the said means being capable of being rendered non-effective for spotting of the hauled vehicle, or other purposes.

It is also an important object of my invention to provide a means or mechanism for controlling and arresting the relative angular horizontal movement of a hauled and hauling vehicle about their axis of connection, adapted to function in response to the inertia of the hauled vehicle, which may be utilized in conjunction with a fifth-wheel braking mechanism connected to the braking systems of the vehicles or may constitute the sole means for controlling movement on the axis of the fifth wheel.

Other objects and advantages flowing from the practicing of my invention will doubtless present themselves as the description proceeds and I would have it understood that I reserve unto myself all rights to the full range of equivalents, both in structure and in avenues of use, to which I may be entitled under my invention in its broadest aspect.

For the purposes of this disclosure, I have elected to present my invention as it may be employed in conjunction with a fifth-wheel brake of the general characteristics of that shown in my aforesaid co-pending application and a more or less conventional layout of the vehicle braking systems, utilizing compressed air, that are employed at present in the construction and operation of trains of the type to which this invention is applicable. However, this is merely illustrative and does not constitute a limitation of the scope of my invention which may take other forms than that herein shown and, as before stated, may constitute the sole means for retarding and arresting relative angular horizontal movement between coupled vehicles, as described, or may be used in conjunction with other types of braking systems, whether of the hydraulic, electrical, vacuum or other type.

In the accompanying drawings, I have illustrated a preferred embodiment of my invention, which, however, may take other forms to meet various requirements of production and use.

Figure 1:
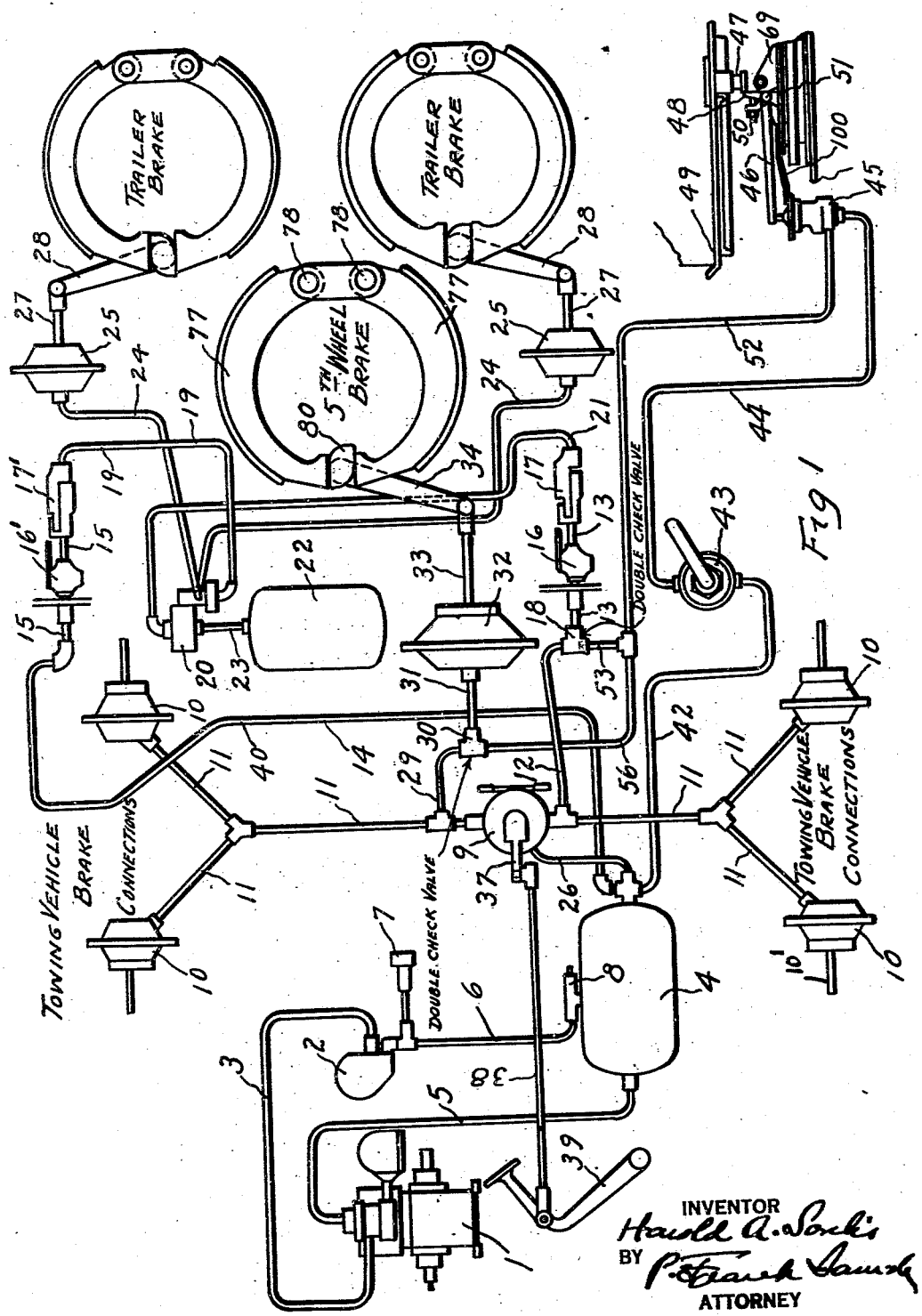
Figure 1 is a schematic diagram of a conventional air braking system, illustrating the connections for the application of the compressed air used in the system to the vehicle brakes and to the fifth-wheel brake; also the means whereby the fifth-wheel brake and the hauled vehicle brakes are functioned, in response to the inertia of the hauled vehicle.
Figure 2:
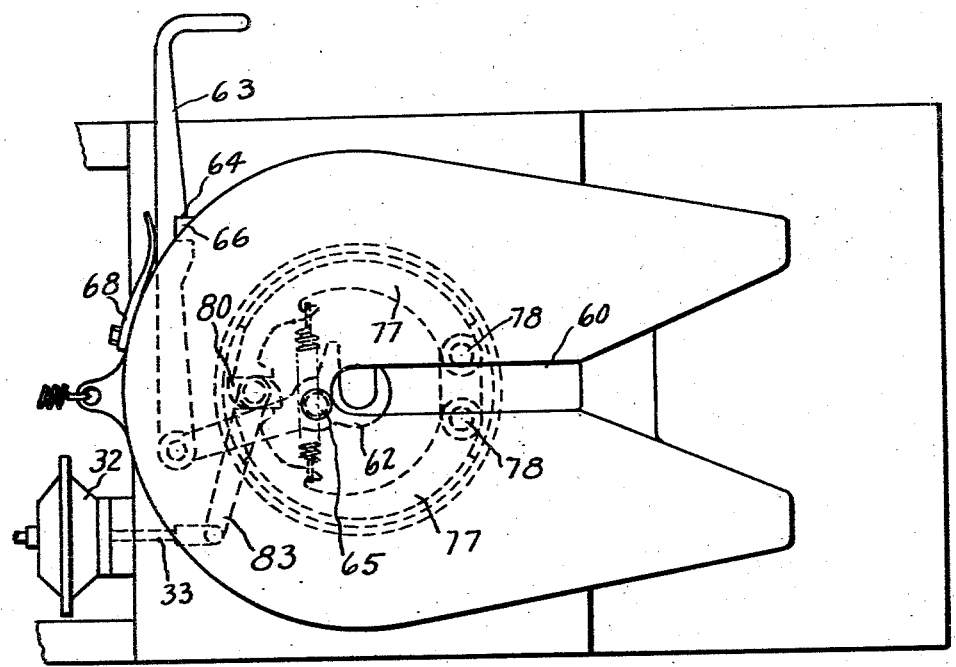
Figure 2 is a plan view of the so-called lower fifth-wheel, showing the assembly mounted on the pick-up plate and the powered vehicle frame.

Referring now to the drawings in detail, in which like characters of reference are employed to designate similar parts in the several views, 1 indicates a conventional type of compressor which is driven directly from the engine shaft or from one of the auxiliary shafts of the towing vehicle, and provides the air for operating the braking systems, a governor 2 serving to regulate the pressure in the reservoir or tank 4 between minimum and maximum settings. In operation, the governor 2 functions through pipe 3 to unload the compressor discharge valves when 100 to 105 pounds pressure is reached in the reservoir or tank. As will be noted, the compressor is connected through pipe 5 to the aforesaid reservoir or tank 4, while the latter is connected by the pipe 6 to the governor 2, the gauge 7 in the latter pipe indicating the pressure in the reservoir or tank. A safety valve 8 connected between the reservoir 4 and the pipe 6 provides against excessive pressure in the reservoir.

A valve 9 controls the brake operation, by directing the flow of air from the reservoir or tank 4 to the brake chambers 10 in the application of the brakes and from the latter chambers to the atmosphere in the releasing of the brakes, this valve being connected to the reservoir or tank by the pipe 26, the air, in the application of the brakes passing from the valve through the pipes 11 to said chambers 10, which function the usual levers (not shown) for operating the brakes. In other words, the so-called power chambers 10, one for each wheel, convert the stored energy (the compressed air) into mechanical effort to apply the brakes.

A pipe 12 connects the aforesaid valve 9 to the service line connection 13, through a suitable check valve 18, while pipe 14 connects the hauled vehicle emergency line 15 to the reservoir 4, suitable cut-out 16 being provided between the connection 13 and the coupling 17. An emergency line coupling 17' through the cut-out 16' communicates with the pipe 15 at one end and at the other is connected to the pipe 19 which leads to the relay-emergency valve 20 at the emergency line inlet while the pipe 21 leads from the aforesaid coupling 17 to said valve 20. This valve 20, as will be noted, communicates with the reservoir 22 through the pipe 23 and, through the pipe 24, with the hauled vehicle brake chambers 25.

Now, when the valve 9 is opened, air flows from the reservoir 4, through the pipe 26, past the valve to enter pipe 12 and issue into pipe 13 after passing through the check-valve 18. From pipe 13, it continues through the coupling 17 into pipe 21 to the relay-emergency valve 20 and then through the line 24 to the hauled vehicle brake or power chambers 25, where a connecting rod 27 pivoted to the brake cam lever 28 functions to actuate the latter to turn the brake cam to expand the brake shoes against the drums of the hauled vehicle braking system. When the valve 9 is closed, the air in the power chambers 25 is released through an exhaust port automatically opened to the line by the closure of the valve aforesaid.

Simultaneously with the opening of the valve 9, as just described, for functioning the vehicle braking system, the compressed air issued into pipe 29 and through the check-valve 30 and pipe 31 to the fifth-wheel power chamber 32 to actuate the connecting rod 33 and rock the lever 34 and rotate the cam 80 to urge the brake shoes 77 into engagement with the drum of the fifth-wheel braking system, it being obvious, that the air is released through the connections with the chamber 32 by the closing of the valve 9, in the manner heretofore described.

Concurrently with the operation of the hauled vehicle brakes and the functioning of the fifth-wheel braking mechanism, the brakes of the towing vehicle, of course, are energized, the air passing from the valve 9 to the pipes 11 into the chambers 10 to actuate the piston rods 10' which have appropriate lever connections with the cams which urge the brake shoes into contact with the drums of the systems, as described with reference to the hauled vehicle, the valve 9 being actuatable through the medium of the pedal 39 and the rod 38 connecting it to the lever 37 on said valve housing.

As will be observed, the relay-emergency valve 20, connected to the tank or reservoir 4, as heretofore described, is provided to relay brake action from the powered vehicle and permit an automatic brake application in case of so-called "brake-in-two" between the powered vehicle and the hauled vehicle.

For the actuation of the fifth-wheel brake in conjunction with the forward movement of the king pin of the fifth-wheel assembly, indicated at 47, I provide a pipe 42, leading from the reservoir 4 to the hand-actuatable valve 43, which communicates with the operating valve 45, through the pipe 44. The valve 45 may be of the plunger type, one end of the bell-crank lever 46 bearing thereon to depress and open the valve, as the lever is rocked on its fulcrum in the bracket 51 in response to the forward movement of the king pin abutting upon the perpendicular portion 48 of said lever, as the hauled vehicle overrides the towing vehicle. An adjustment screw 50, mounted in a member carried on the bracket 51 is provided to take up lost motion between the bell crank lever ends and insure virtually instantaneous response of the braking action on the fifth-wheel to the forward movement of the king pin. The king pin, of course, is carried by the hauled vehicle, while the aforesaid bracket 51 is a part of the assembly on the powered vehicle, this bracket and the valve 45 being mounted in fixed positions on the base-plate 69.

As the valve 45 is opened by the rocking of the lever 46—48, the air in the line between the reservoir 4 and the valve, as previously described, will flow through pipe 52 into pipe 53, through the check valve 18 and pipe 13 to the cutoff valve 16 and thence through the coupling 17 to pipe 21 to the relay-emergency valve 20. From the latter, the air passes into the pipes 24 to the power chambers 25 whereby the hauled vehicle brakes are actuated as previously explained.

The closing of the valve 45, of course, allows the compressed air lines to be released into the atmosphere. With the opening of the valve 45, in the application of the hauled vehicle brakes, the air passes from the pipe 52 into the pipe 56 and through the check valve 30 and pipe 31 to the power chamber 32 which actuates the piston rod 33 to function the lever 34 and the cam 80 movable therewith to expand the brake shoes 77 which move on the fulcrum points 78 for engagement with the associated brake drums of the fifth-wheel brake, as heretofore set forth. The air is released from the power chamber 32, through the line, as the valve 45 is closed.

The valve 30 allows compressed air to flow from pipe 29 to pipe 31 and from pipe 56 to pipe 31 but does not afford communication between pipes 29 and 56, while the check-valve 18 is adapted to connect pipe 53 to pipe 13 and pipe 12 to the latter, shutting off communication between pipes 12 and 53. By providing the valve 43, the operator of the hauling vehicle may cut out the operation of the fifth-wheel brake in response to the forward movement of the king pin 47 to rock the lever 46—48 and actuate the valve 45, so that the braking system of the hauled vehicle alone will function when the hauled vehicle overrides the towing vehicle, or he may condition only the fifth-wheel brake for operation, as the king pin moves forward with relation to the powered vehicle supporting means, depending upon the requirements of the particular service in which the vehicles are at the instant engaged. Normally, of course, that is in road service, the valve 43 would be actuated to the position to allow the compressed air to pass through pipes 42 and 44 to the valve 45 so that the air will enter the brake power chambers 25 and the fifth-wheel power chamber 32, as the king pin moves forward on the powered vehicle.

Figure 3:
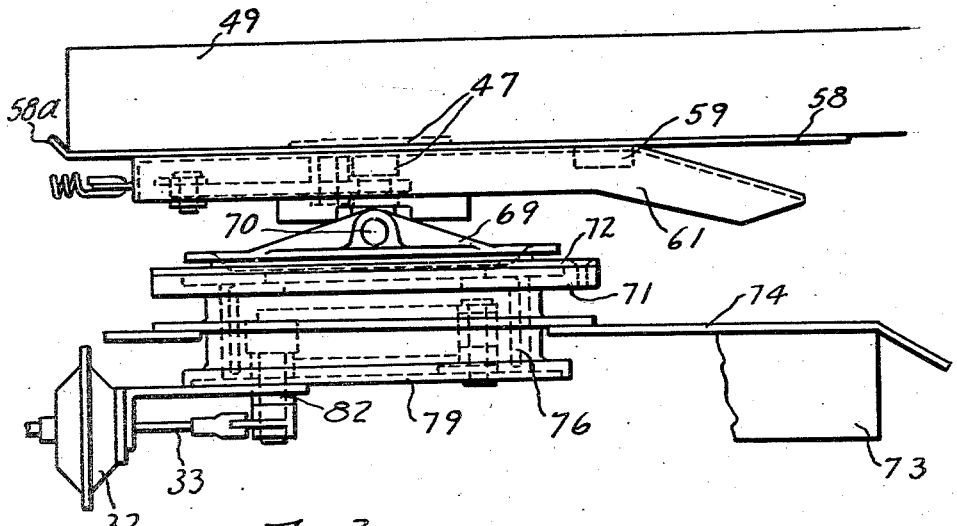
Figure 3 is a side elevation of Figure 2, illustrating the lower fifth-wheel coupled to the upper fifth-wheel with the upper and lower fifth-wheel key in position.
Figure 5:
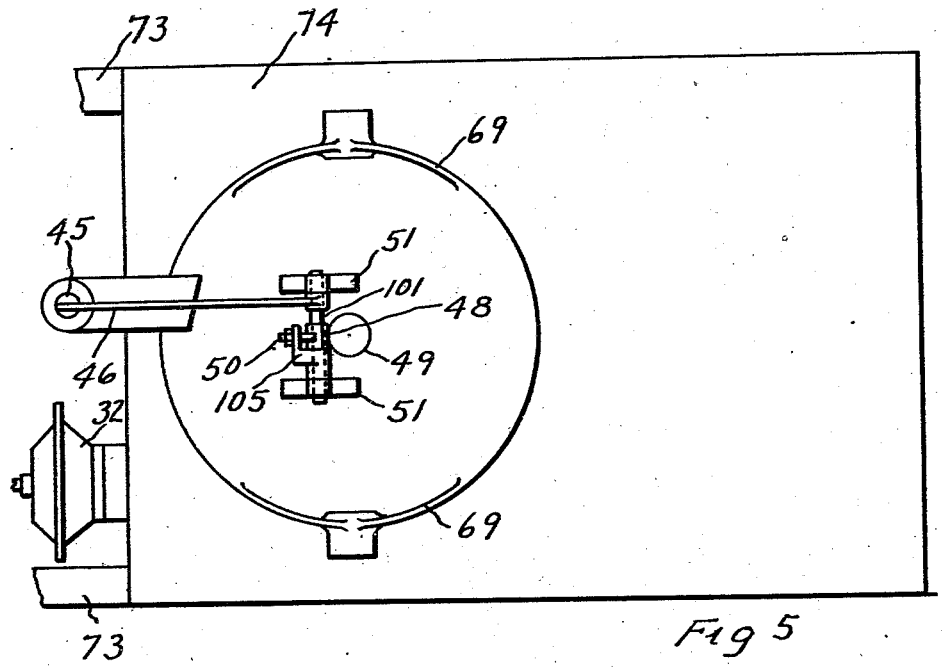
Figure 5 is a plan view of a portion of the lower fifth-wheel, showing the means for operating the braking mechanism in response to forward motion of the king-pin.

Various forms of fifth-wheel constructions, of course, may be utilized in the practicing of my invention. As herein shown, a plate 58 carrying the king pin 47 is fixed to the frame 49 of the hauled vehicle and forms what is termed the upper fifth wheel. A block 59 is attached to said plate 58 and is adapted to slide in the slot 60 of the fifth wheel member 61 and prevents relative rotative motion of the parts 58 and 61 when they are coupled by means of the lock 62 engaging the king pin 47. This lock is held in locking position by means of the latching lever 63, notched at 64 to engage a projection 66 on the fifth wheel member 61, the lock being fulcrumed on the pin 65. The latching lever 63 is adapted to be disengaged from the projection 66, in opposition to its spring 68, this movement effecting the disconnection of the locking member 62 from the king pin 47, as may be clearly seen from Figure 3.

Figure 4:
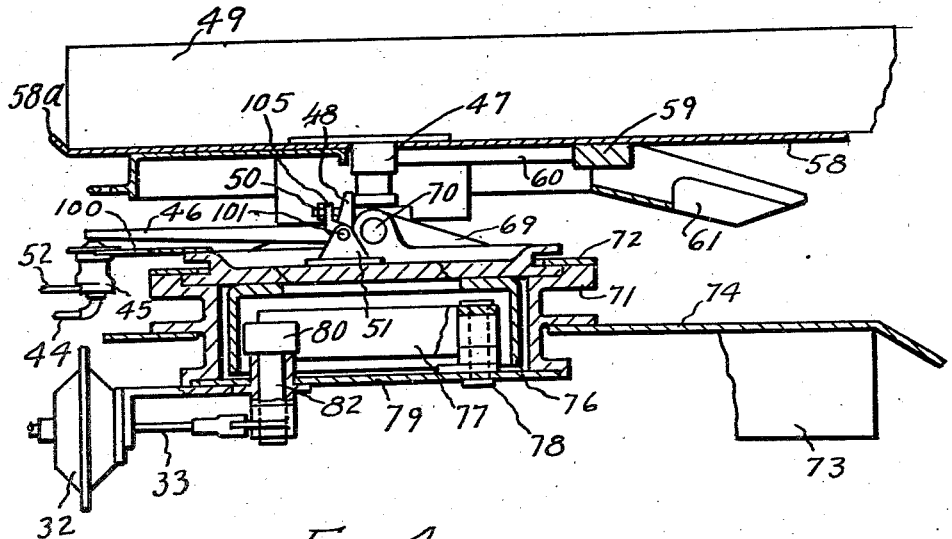
Figure 4 is a sectional elevation of the fifth-wheel assembly, embodying my invention.

The aforesaid fifth-wheel member 61 is fulcrumed and held in association with the base member 69, as at 70, and is mounted for rotative movement on the supporting member 71, the latter carrying an annulus 72 which projects into a peripheral slot or groove with the base member 69 to restrain it against vertical movement, as shown in Figure 4. As will be evident, the supporting member 71 is rigid with the frame of the hauling vehicle, being fixed thereto by the plate 74 bolted or otherwise fastened to said member and the frame 73.

A brake drum 76 is carried by the fifth-wheel member 69 for movement therewith, while the brake shoes 77 are fulcrumed at 78 to the backing plate 77 rigid with the supporting member 71. The cam 80, carried by the shaft 82 mounted in suitable bearings associated with the backing plate is actuatable in response to the movement of the lever 34, as previously described. Since the brake drum 76 is carried by the rotatable member 69, and the shoes are mounted on the relatively fixed member 71, through the medium of the backing plate 79, it will be manifest that as the shoes are urged apart into contact with the drum, the rotative movement of the member 61 and the king pin locked thereto, will be retarded in proportion to the pressure applied to the brake shoes.

The valve 45 is fixed to the fifth wheel member 69 by the bracket 100, while the arms 45 and 48 constituting the bell-crank lever for functioning said valve are carried by the shaft 101, the arm 48 being loosely mounted thereon, for relative adjustment to the king pin, as heretofore pointed out, through the medium of the set screw 50 and the adjusting lever 105, fixed to said shaft 101, which carries the adjusting screw.

While I have described my invention more or less specifically with reference to the embodiment shown, it will be manifest that various changes in the details of construction and in the arrangement or assembly of the cooperating parts may be made to meet various production and operating requirements, as well as to comply with State regulations with respect to the operation of motor vehicles within their respective territories, in attaining the objectives of my invention as heretofore set forth and without departing from the spirit and scope thereof, as defined by the appended claims.

I claim:

1. In combination with a tractor and a trailer respectively embodying relatively rotatable elements constituting a fifth wheel assembly, a braking system for retarding and arresting the movement of said vehicles and means associated with said fifth wheel assembly adapted to control the relative horizontal angular movement of the two vehicles on the axis of said assembly, solely in response to the inertia of the trailer.

2. In a highway train, comprising a towing vehicle and a hauled vehicle, a resilient pivotal connection between said vehicles and means associated with said connection to resist pivotal movement of the two vehicles about the axis of said connection, in response to the yielding of the coupling in the direction of travel of the vehicles.

3. The combination with a fifth wheel assembly for connecting a hauled vehicle to a towing vehicle, of means for controlling the relative horizontal angular movement of the two vehicles on the axis of said assembly solely in response to a predetermined radial movement of said axis.

4. The combination with a fifth-wheel assembly for connecting a hauled vehicle to a towing vehicle, of means for controlling the relative horizontal angular movement of the two vehicles on the axis of said assembly, solely in response to a predetermined radial movement of said axis, and means for rendering said controlling means non-effective.

5. A fifth wheel construction for coupling a towing vehicle to one to be towed, including means for controlling the relative horizontal angular movement of the vehicles connected by such construction, in response to a forward shifting of the axis of movement of the fifth wheel construction and means between said controlling means and the axis of movement of the fifth wheel construction adjustable to compensate for variations in the degree of the shifting movement required to function said controlling means.

6. The combination with a fifth wheel assembly, including a king pin, means associated with said assembly to retard and arrest relative rotative movement of the components of said assembly and means adapted to function said retarding and arresting means in response to a movement of said king pin in a direction radially of the path of normal rotative movement of the assembly components.

7. The combination with a self-propelled towing vehicle and a towed vehicle, a braking system for said vehicles, means for coupling said vehicles, said means including a fifth wheel assembly, a braking system for controlling the relative rotative movements of the components of the fifth wheel assembly, connections between the vehicle braking system and the fifth wheel braking system for operating both in unison and means solely responsive to the overriding of the towing vehicle by the towed vehicle for functioning said fifth wheel assembly braking system, said latter means being optionally operable in conjunction with the braking system of a vehicle or independently of such braking system.

8. A means for retarding relative horizontal angular movement between a hauled vehicle and a towing vehicle, including a fifth wheel assembly between the hauled and towing vehicles, embodying relatively rotatable supporting and supported components, braking mechanism associated with said fifth wheel assembly adapted to retard and arrest the relative rotative movement of said components and means for rendering said mechanism effective in response to a radial movement of the supported components of said assembly, relatively to the supporting components thereof.

9. In combination with a towing vehicle and a hauled vehicle respectively embodying relatively rotatable elements constituting a fifth wheel assembly, of means operable by increased speed of the hauled vehicle relative to the towing vehicle to resist relative rotatable movement of the elements of the fifth wheel assembly.

10. In combination with a towing vehicle and a hauled vehicle respectively embodying relatively rotatable elements constituting a fifth wheel assembly, a braking system for retarding and arresting the movement of said vehicles, and means operable by increased speed of the hauled vehicle relative to the towing vehicle to operate the braking system of the vehicles and to resist relative rotatable movement of the elements of the fifth wheel assembly.

HAROLD A. SOULIS.